(No Model.)

C. O. JACKSON.
SAFETY GAS VALVE.

No. 563,966.  Patented July 14, 1896.

Witnesses:
L. C. Hills
Isaac H. Hiss

Inventor:
Charles O. Jackson
by A. L. Hough, Atty.

UNITED STATES PATENT OFFICE.

CHARLES O. JACKSON, OF FAIRMONT, WEST VIRGINIA.

SAFETY GAS-VALVE.

SPECIFICATION forming part of Letters Patent No. 563,966, dated July 14, 1896.

Application filed February 19, 1896. Serial No. 579,915. (No model.)

*To all whom it may concern:*

Be it known that I, CHARLES O. JACKSON, a citizen of the United States, residing at Fairmont, in the county of Marion and State of West Virginia, have invented certain new and useful Improvements in Safety Gas-Valves for Supply-Pipes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in safety attachments for gas-pipes, and especially to a valve for use in natural-gas pipes to automatically shut off the aperture in the pipe leading to the burner, when the pressure of the gas will permit, as is frequently the case with the variable pressure in the gas-mains leading from the wells, and by closing of the valve prevent any escape of the gas in case the stop-cock at the burner is left open when the pressure goes off.

A further object of the invention resides in the provision of a hinged swinging valve adapted to close over an aperture in a union or valve chamber, through which aperture the gas coming from the main is caused to pass before entering the pipe leading to or carrying the burner, it being my plan to utilize one of these valves wherever a burner is used connected to the gas-main, and the provision of means whereby the valve may be lifted slightly and allow the gas from the main to pass through the aperture, the valve being kept open as long as the pressure is on.

To these ends and to such others as the invention may pertain the same consists further in the novel construction, combination, and adaptation of the parts, as will be hereinafter more fully described, and then specifically defined in the appended claim.

I clearly illustrate my invention in the accompanying drawings, which, with the letters of reference marked thereon, form a part of this specification, and in which drawings similar letters of reference indicate like parts throughout the several views, in which—

Figure 1:
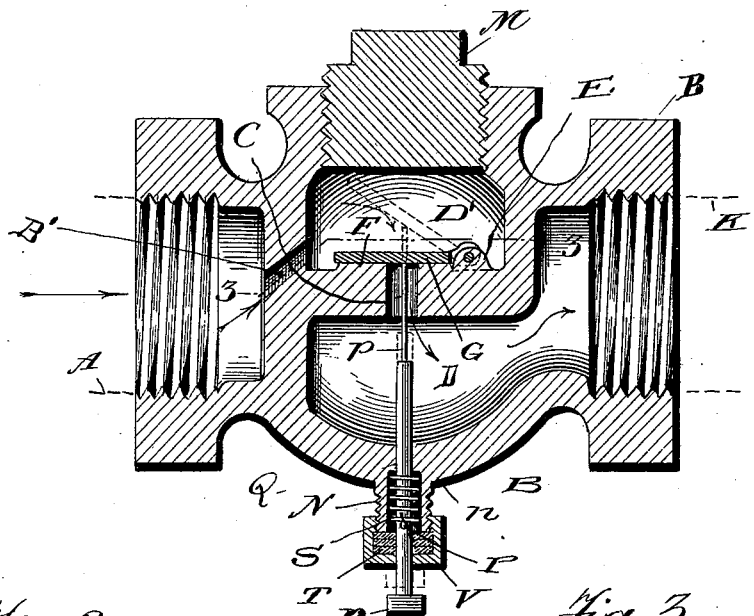
Figures 2, 3:
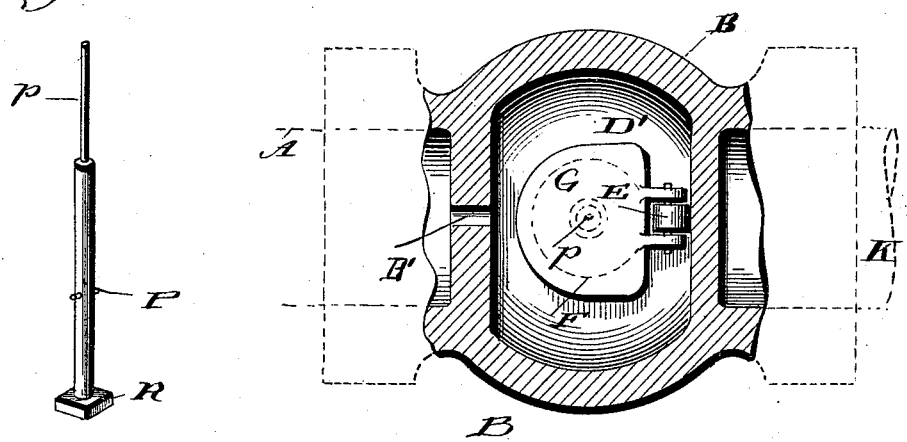

Figure 1 is a vertical central longitudinal view of the union and valve embodying my invention. Fig. 2 is an enlarged detailed view of a spring-actuated pin adapted to raise the swinging valve. Fig. 3 is a sectional view of the union containing my improved safety-valve on line 3 3 of Fig. 1, parts being broken away to better illustrate the parts within.

Reference being had to the details of the drawings by letter, A designates the pipe leading from the main located outside of the house, to which pipe is connected the union B, having a vertically-disposed duct C leading into the chamber D. An inclined duct B' leads from one end of the union, to which the pipe A is connected, into a chamber D'. Pivoted to a lug E on the shoulder F is the valve G, which normally rests on the seat or upper surface of the said shoulder to close the aperture leading from the said chamber to the chamber D, that communicates with the pipe K, which carries the burner.

M is a screw-plug fitted into the aperture on the union.

Mounted so as to work in the tube or casing N, which is integral with the union at n, is the spring-actuated pin P, which works snugly through the aperture Q and carries at one end the projecting portion p, which is adapted to rest against the under side of the said valve. The lower end of the said pin has a head R, and S is a spring carried about the pin and designed to hold the pin in the position shown in Fig. 1. A suitable packing T is placed about the pin in the nut V, which holds the spring in place and surrounds the stem of the spring-actuated pin.

The operation of the invention is as follows: When the pressure has been reduced, so that the valve will close by gravity, and it is desired to open the same when the pressure again appears in the pipe leading from the main, the operator pushes up on the lower end of the spring-actuated pin, which causes the valve to rise up a short distance, and the gas coming through the inclined duct is directed against the under side of the valve, and the valve will be kept in this open position as long as the pressure is on. The valve or stop-cock at the burner may then be opened and the gas ignited. Whenever the pressure blows off, the valve will automatically close, and, cutting off the communication, all danger of escaping gas at the burner will be avoided in case the valve or stop-cock should be left open at any time.

Having thus described my invention, what I claim to be new, and desire to secure by Letters Patent, is—

In a safety gas-valve for supply-pipes, the combination with the union having a duct C in a partition-wall therein, a valve G seated over same, of the inclined duct B' opening in a line with the free edge of the said valve opposite its pivotal point when the said valve is open, of the spring-actuated pin P having a contracted upper end $p$ held in the aperture C, with its free end against the under side of the said valve, substantially as shown and described.

In testimony whereof I affix my signature in presence of two witnesses.

CHAS. O. JACKSON.

Witnesses:
FRANKLIN H. HOUGH,
HARRY Y. DAVIS.